Dec. 23, 1952 F. E. KNAPP 2,622,891
TRAILER TOWING DEVICE
Filed Feb. 13, 1950
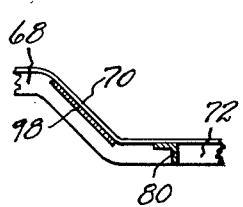
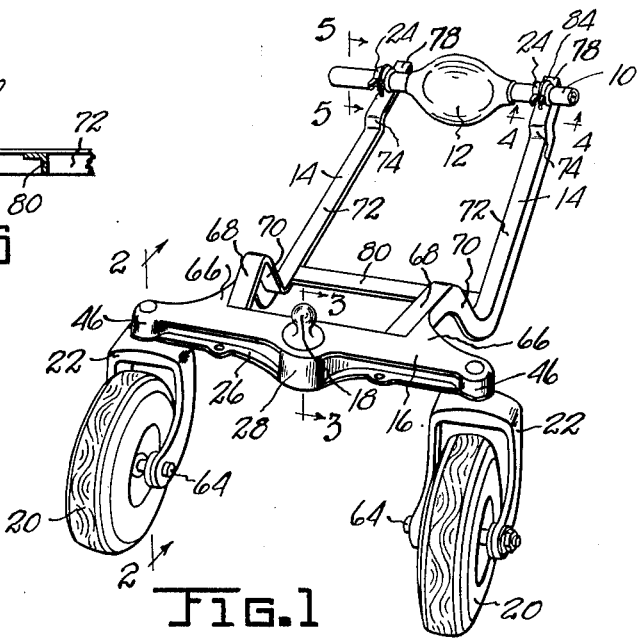
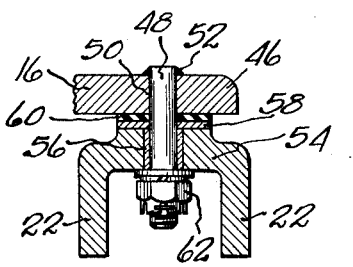
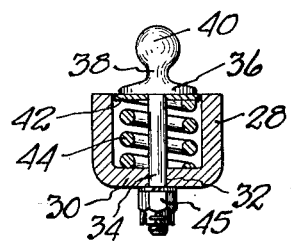
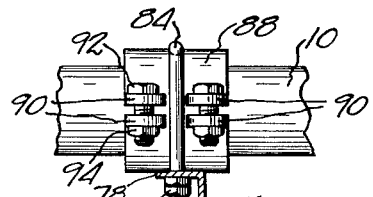
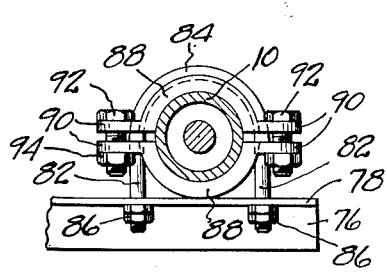
INVENTOR.
FRANKLIN E. KNAPP.
BY
Oltsch & Knoblock
ATTORNEYS Patented Dec. 23, 1952

2,622,891

UNITED STATES PATENT OFFICE 2,622,891

TRAILER TOWING DEVICE

Franklin Earl Knapp, South Bend, Ind., assignor to Riser M. Simpson, South Bend, Ind.

Application February 13, 1950, Serial No. 144,019

1 Claim. (Cl. 280—33.4)

This invention relates to improvements in trailer towing devices, and more particularly to a device by means of which trailers, and particularly house trailers which have wheels supporting only one end thereof, may be towed.

The primary object of this invention is to provide a novel and inexpensive trailer towing mechanism which trails the towing vehicle accurately, which effectively supports part of the weight of the vehicle being towed, and which facilitates maneuvering of a tractor trailer combination.

A further object is to provide a device of this character having a novel frame construction which includes a downwardly offset draft portion having both ground clearance and clearance below the body of the tractive vehicle so that it may be connected at the rear axle housing of said tractive vehicle.

A further object is to provide a device of this character having a novel attachment mechanism for connection thereof to the housing of an automobile axle, and which is characterized by a freedom to pivot about said axle housing without detracting from the true trailing or following relation of the device with respect to the tractive vehicle.

A further object is to provide a device of this character having a draft frame, a kingpin and a pair of wheel units supporting said draft frame adjacent to said kingpin, wherein each point of connection between the aforementioned parts includes a resilient element to absorb vibration, road shock and impact.

Other objects will be apparent from the following specification.

In the drawing:

Fig. 1 is a perspective view of the device illustrating the manner in which it is connected to an automotive axle illustrated fragmentarily.

Fig. 2 is an enlarged fragmentary vertical sectional view taken on line 2—2 of Fig. 1.

Fig. 3 is an enlarged vertical fragmentary sectional detail view taken on line 3—3 of Fig. 1.

Fig. 4 is an enlarged fragmentary sectional view taken on line 4—4 of Fig. 1.

Fig. 5 is an enlarged fragmentary sectional view taken on line 5—5 of Fig. 1.

Fig. 6 is a longitudinal fragmentary sectional view of a detail forming a modified embodiment of the invention.

Referring to the drawing which illustrates the preferred embodiment of the invention, the numeral 10 designates the axle housing of an automotive vehicle, the same being the rear axle, and which housing 10 includes the usual enlarged portion 12 for the automotive drive differential mechanism. The axle and differential housing may be of any character used on an automobile upon which is mounted, through suitable spring suspension means and the like, the body of an automotive vehicle (not shown). My improved trailer towing device is intended to be attached to the rear axle 10 in the manner illustrated in Fig. 1 with the connection parts or arms thereof extending rearwardly and below the rear portion of the automobile body with clearance.

My improved device comprises a pair of rigid draft arms 14, a cross-frame 16 secured to the rear ends of the arms 14, a kingpin 18 carried centrally by the cross-frame 16, a pair of supporting wheels 20, and yoke type wheel mounting members 22 to which the wheels are journaled and which are swiveled to the ends of the cross-frame 16. Also included as a part of the device are means 24 by which the device is connected to the axle housing 10.

The cross-frame 16 is preferably formed as a rigid cast metal structure, ribbed or flanged, as at 26, to reinforce the same. At its center the cross-frame 16 has an integral cup-shaped part 28 which is open at its top, as best seen in Fig. 3, and has a closed bottom 30 with a central aperture 32. A shaft 34 fits snugly and slidably in the aperture 32 and extends centrally axially vertically through the cup portion. The upper end of the shaft 34, which constitutes the shank of the kingpin 18, mounts a kingpin head, preferably characterized by an enlarged transverse flange 36, a relatively reduced neck portion 38, and a spherical top portion 40. The flange 36 bears against a disk or plate 42 which is apertured centrally and is of a diameter having a snug but free sliding fit within the interior of the cup member 28. A coil spring 44 fits within the cup member, encircling the kingpin shank 34 and resting upon the bottom 30. The spring 44 forms a support for the disk 42 and the kingpin head and is preferably made of such strength as to sustain in partly compressed condition the full weight which is applied thereto from the vehicle to be towed. The lower end of the kingpin shaft 34 projects below the bottom 30 of the frame and is screw-threaded to provide locking means 45, here illustrated as a castellated nut and a cotter-pin retainer.

The opposite ends 46 of the cross-frame 16 are suitably dimensioned and shaped to render the same of adequate strength, and each thereof mounts a vertical depending stub shaft 48. As best illustrated in Fig. 2, the frame end portions 46 each have a vertical aperture 50 therein within which a portion of the shaft 48 has a tight fit, preferably a pressed fit. The shaft 48 will be fixedly secured to the cross-frame in any manner found suitable. One manner found effective is illustrated herein at Fig. 2 and entails the projection of the upper end of the shaft 48 slightly above the level of the top of the frame portion 46, thus providing means for the formation of an effective weld connection between said frame portion 46 and the projecting part of the shaft 48.

The yoke 22 includes the upper cross part 54 having a central opening therein which is preferably lined by a suitable bearing sleeve 56. The yoke is swiveled upon the shaft 48 which fits snugly and rotatively within the sleeve 56. Interposed between the cross-frame part 46 and the yoke end 54 is an apertured metal bearing plate 58 which has a flat bearing engagement with the top surface of the part 54 of the yoke and which supports a resilient pad 60, such as a rubber pad, upon which the bottom surface of the cross-frame portion 46 bears. The lower end of the shaft 48 projects between the arms of the yoke 22, and suitable securing means 62 are provided to hold the yoke to the cross-frame, said securing means being here illustrated as a castellated nut anchored against rotation by a cotterpin.

The lower free ends of the depending arms of the yoke 22 carry crosspins or shafts 64 upon which wheels 20 are journaled. The wheels 20 are preferably provided with pneumatic tires, as illustrated. The arms 22 are preferably bent, as illustrated in Fig. 1, so that the pin or shaft 64 is not located directly below the shaft 48, thereby facilitating the swiveling of the yoke and wheel units as required in the manner well understood in the art.

At the front side of the cross-frame in equi-spaced relation to the opposite ends thereof and to the kingpin 18 are formed forwardly projecting portions 66 of any suitable configuration. The elongated longitudinal frame members 14 preferably constitute members of standard structural shape, such as angle irons, channels or the like, angle irons being here illustrated. The members 14 are bent at spaced points along their length to the shape substantially as illustrated in Fig. 1, and characterized by a rear straight portion 68 which bears against the cross-frame 16 and the projection 66 thereof, and is suitably fixedly secured thereto, as by means of welded joints or by bolts, rivets or any other suitable means. At a point spaced slightly forwardly from and clear of the cross-frame 16 is provided a downwardly bent intermediate portion 70, the spacing of the part 70 from the frame being such that when the wheel mounting yokes 22 make a complete revolution, the same and the rubber tired wheels carried thereby will pass said downwardly projecting parts 70 with clearance. The central portions 72 of the members 14 are straight and extend rearwardly and substantially horizontally in normal operative position, the same being located at a level slightly below the level of the axle housing 10. At the rear portion of each member 14, the same is preferably bent to offset the same upwardly slightly, and the rear end portion 76 of each member 14 is straight, as best seen in Fig. 5. The members 14 are so arranged, where formed of channel members or the like, that one flange 78 of the part 76 thereof will extend substantially horizontally when the device is operatively positioned. One or more crossbars 80 interconnect the draft members 14 in forwardly spaced relation to the cross-frame 16 and preferably spaced rearwardly from the end portions 76 thereof, said crossbars 80 being welded, bolted or otherwise fixedly secured at their ends to the draft members 14.

The means 24, by which connection between the axle housing 10 and the draft members 14 is effected, are preferably of the construction best illustrated in Figs. 4 and 5. The flange 78 of each draft member 14 has a pair of holes formed therein in longitudinally spaced relation, the same being spaced apart a distance greater than the diameter of the axle housing 10. These holes are adapted to receive the end portions 82 of a U-bolt 84. The shank portions 82 are screw-threaded and mount nuts 86 which serve to anchor the U-bolt to the draft member 14. The U-bolt 84 cooperates with the draft member 14 to effect a clamping engagement with a sleeve unit encircling the axle shaft, as here illustrated. The sleeve unit is split and comprises a pair of arcuate members 88 which fit snugly upon the shaft housing 10. The members 88 have a central circumferential groove formed therein which is adapted to receive and provide a seat for the U-bolt 84. The parts 88 are also provided at each end thereof with a pair of spaced ears 90, the adjacent ears being spaced apart a distance sufficient to permit the U-bolt to pass therebetween, as best illustrated in Fig. 4. Bolts 92 which mount nuts 94 serve to clamp the ring parts 88 together.

The device possesses a number of advantages. Its connection with the axle housing constitutes one of these advantages. The connection at this point applies the tractive force from the tractive vehicle to the trailer at the housing of the driving axle so that none of the forces which act between the tractive and the trailing vehicles are transmitted through the body or chassis of the tractive vehicle. In this connection it will be understood that the trailer is connected to the device by a hitch (not shown) of any conventional construction, which is detachably secured at and fits rotatably upon the spherical end portion 40 of the kingpin. It will be understood that while the use of a king pin is preferred, the device may mount in its place a hitch element of any other type or character found suitable or desirable. This differentiates over the usual construction of a trailer dolly common in this art and which is characterized by the connection of the dolly at the vehicle chassis or bumper so that the forces of both pulling and stopping act through the chassis of the tractive vehicle and the spring suspension of the tractive vehicle, increasing the danger or likelihood of injury or damage to the tractive vehicle because of such force transmission, as compared to the structure here shown where the device is connected at the driving axle.

Another advantage of the device is that the connection thereof with the driving axle is such as to provide, on the one hand, a true trailing or following movement of the dolly, and on the other hand, to permit the pivoting of the dolly vertically. Thus as the device encounters any condition where the roadway or surface on which the tractive vehicle rides is at a different level or inclination than that upon which the trailing vehicle travels, the draw-bars 14 may pivot or swing around the axle housing 10 as a center by virtue of the U-bolt and sleeve construction illustrated in Figs. 4 and 5.

The device can be made of any strength desired and therefore can be fully rigid and capable of withstanding all forces applied thereto in use. At the same time the device does not apply any downward load upon the tractive vehicle nor tend in any way to flex the springs of the tractive vehicle. To the extent that any downward thrust or weight is applied by the device to the vehicle, it is applied to the vehicle axle only so that it is usable for the purpose of increasing the traction of the drive wheels of the tractive vehicle with the ground and does not in any way act detrimentally upon the tractive vehicle.

The device is also characterized by yielding connections at the various load-bearing points thereof. Thus the pads 60 provide a cushioning action between the two yokes and the cross-frame, and the coil spring 44 provides a cushioning action between the vehicle being trailed and the cross-frame. To a certain extent this same yielding action applies also to the connection of the device to the shaft axle, at least in the sense that the freedom of the parts to rotate, as described above, will avoid the application of undesired strain or stress either to the vehicle or the trailer dolly.

The device is further characterized by ease of maneuvering of the tractor trailer combination which is especially valuable when vehicles are driven rearwardly or "backed." Observe in this connection that the provision of the two rigid forwardly extending draft arms connected at the axle housing of the tractive vehicle at predetermined points along the length of those draft arms, insures against the occurrence of any tendency of the device to swing or move laterally relative to the tractive vehicle. Consequently, when the tractive vehicle is driven rearwardly, its longitudinal center line remains at all times in parallel relation to or remains an extension of the longitudinal center line of the chassis of the tractive vehicle. No tendency of the parts to be unduly stressed when the vehicle is turned during rearward motion occurs as a result of this relation of the dolly to the vehicle chassis, however, because of the swiveled connection of the wheels 20. In other words, when the vehicle and dolly are moving rearwardly and the steering wheels of the vehicle are turned, which action tends to cause lateral swinging of the cross-frame, that lateral swing is fully accommodated by the swivel of the wheels to the proper angle to permit the wheels to roll freely and to be free of any cross thrust or force.

A modified embodiment of the invention is illustrated in Fig. 6 which entails the provision of a rigid plate or panel 98 spanning the longitudinal draft arms 14 at the inclined portion 70 thereof and positioned in an inclined plane preferably at the same inclination as the part 70. This inclined plate may be bolted, welded or otherwise secured to the draft arms and preferably will be of a dimension substantially coextensive with the longitudinal dimension of said inclined draft arm portion 70. This plate constitutes a wind plate which introduces a downward force upon the device to tend to hold it in contact with the roadway. In other words, the wind resistance encountered by the plate 98 serves to hold the device down. This down pressure derived from wind resistance is of particular value when the device is attached to a vehicle which is traveling along the road at high speed and does not have a load, such as a trailer, connected thereto. The tendency of the unweighted or unloaded dolly in such circumstances, especially at high speeds, would be to start to bounce as a result of striking stones or expansion joints in pavements. The wind resistance plate will tend to minimize such bouncing movement of the unloaded dolly when traveling at high speed.

It will be understood that, while the constructions of the device as herein described and illustrated are preferred, changes may be made therein within the scope of the appended claim without departing from the spirit of the invention.

I claim:

A trailer towing device, comprising a pair of elongated rigid draft members, a cross frame secured to the rear ends of said members, a kingpin carried by said frame, a pair of wheeled units swiveled to and supporting said frame, a pair of split sleeves adapted to embrace an axle housing of an automotive vehicle, each sleeve having a circumferential groove, and a member extending around each sleeve within said groove and secured to a draft member.

FRANKLIN EARL KNAPP.

REFERENCES CITED

The following references are of record in the file of this patent:

UNITED STATES PATENTS

| Number | Name | Date |
|---|---|---|
| 1,550,502 | Chamberlain | Aug. 18, 1925 |
| 1,845,345 | Sauzedde | Feb. 16, 1932 |
| 2,205,151 | Partin | June 18, 1940 |
| 2,325,822 | Whitmer | Aug. 3, 1943 |
| 2,385,196 | Diesel | Sept. 18, 1945 |
| 2,453,916 | Inskeep | Nov. 16, 1948 |
| 2,475,971 | Livernois | July 12, 1949 |
| 2,500,686 | Jontz | Mar. 14, 1950 |

FOREIGN PATENTS

| Number | Country | Date |
|---|---|---|
| 280,362 | Great Britain | Nov. 17, 1927 |